United States Patent
Said et al.

(10) Patent No.: US 9,854,045 B2
(45) Date of Patent: Dec. 26, 2017

(54) GENERIC CLOUD ENABLING OF STATEFUL APPLICATIONS

(71) Applicants: Bare Said, Sankt Leon-Rot (DE); Peter Eberlein, Malsch (DE)

(72) Inventors: Bare Said, Sankt Leon-Rot (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 389 days.

(21) Appl. No.: 14/685,287

(22) Filed: Apr. 13, 2015

(65) Prior Publication Data

US 2016/0301758 A1    Oct. 13, 2016

(51) Int. Cl.
   *G06F 15/173*    (2006.01)
   *H04L 29/08*     (2006.01)

(52) U.S. Cl.
   CPC ........ *H04L 67/142* (2013.01); *H04L 67/1002* (2013.01)

(58) Field of Classification Search
   CPC .......................... H04L 67/142; H04L 67/1002
   See application file for complete search history.

(56) References Cited

U.S. PATENT DOCUMENTS

| 2006/0143290 A1* | 6/2006 | Dostert | H04L 67/14 709/224 |
| 2008/0270709 A1* | 10/2008 | Smits | G06F 9/544 711/147 |
| 2013/0332767 A1* | 12/2013 | Fox | G06F 15/167 714/4.3 |
| 2015/0160956 A1* | 6/2015 | Shah | H04L 63/10 718/1 |

* cited by examiner

*Primary Examiner* — Michael A Keller
(74) *Attorney, Agent, or Firm* — Schwegman Lundberg & Woessner, P.A.

(57) ABSTRACT

A session transfer request is received from a cloud operating system, the session transfer request identifying a first active session and a second enhanced application server of a plurality of enhanced application servers. Then it is verified that cross user data containing information used by a plurality of sessions, including the first active session, is mapped to a first work process in a process pool of the cloud computing environment. Then a central dispatcher on the second enhanced application server is triggered to create a virtual context and a virtual machine corresponding to the first client device. When a subsequent user request is received from a first client device, the subsequent user request is sent to the central dispatcher of the second enhanced application server and the central dispatcher of the second enhanced application server is caused to roll-in the virtual context by attaching it to a free work process.

15 Claims, 8 Drawing Sheets

GENERIC CLOUD ENABLING OF STATEFUL APPLICATIONS

TECHNICAL FIELD

This document generally relates to methods and systems for use with computer networks and applications deployed in them. More particularly, this document relates to a generic cloud enabling of stateful applications.

BACKGROUND

Cloud business applications must comply with many architecture principles that are essential in order to run business applications in a cloud environment with acceptable total cost of ownership. One of these architectural principles is that the cloud environment must leverage both stateless and stateful computing protocols, owing to the fact that some business applications utilize stateless computing protocols and some business applications utilize stateful computing protocols. A stateless computing protocol is a protocol that treats each request as an independent transaction and that is thus unrelated to any previous request. A stateful computing protocol is a protocol that requires the tracking of an internal state so that a subsequent request can be handled in a manner that takes into account a prior request from the same entity. An example of a commonly used stateless computing protocol is the Representational State Transfer (REST) protocol. In the REST protocol, communication between a client and a server occurs in the form of independent pairs of request and response without requesting that the server maintain any information about the session or precedent requests. This architectural principle facilitates much greater flexibility in system operations and also much greater scalability to achieve better data center utilization.

The usefulness of a stateless computing protocol, however, is limited in that there are some business applications, some of them quite complex, that utilize a stateful computing protocol and thus would need to be re-implemented from scratch in order to facilitate a stateless design. This can be quite time consuming and expensive. Extension of such stateful business applications to the cloud, where instances of the application can potentially be distributed to multiple different application servers, is complicated by this lack of compatibility with their stateful designs.

BRIEF DESCRIPTION OF DRAWINGS

The present disclosure is illustrated by way of example and not limitation in the figures of the accompanying drawings.

DETAILED DESCRIPTION

Figure 1:
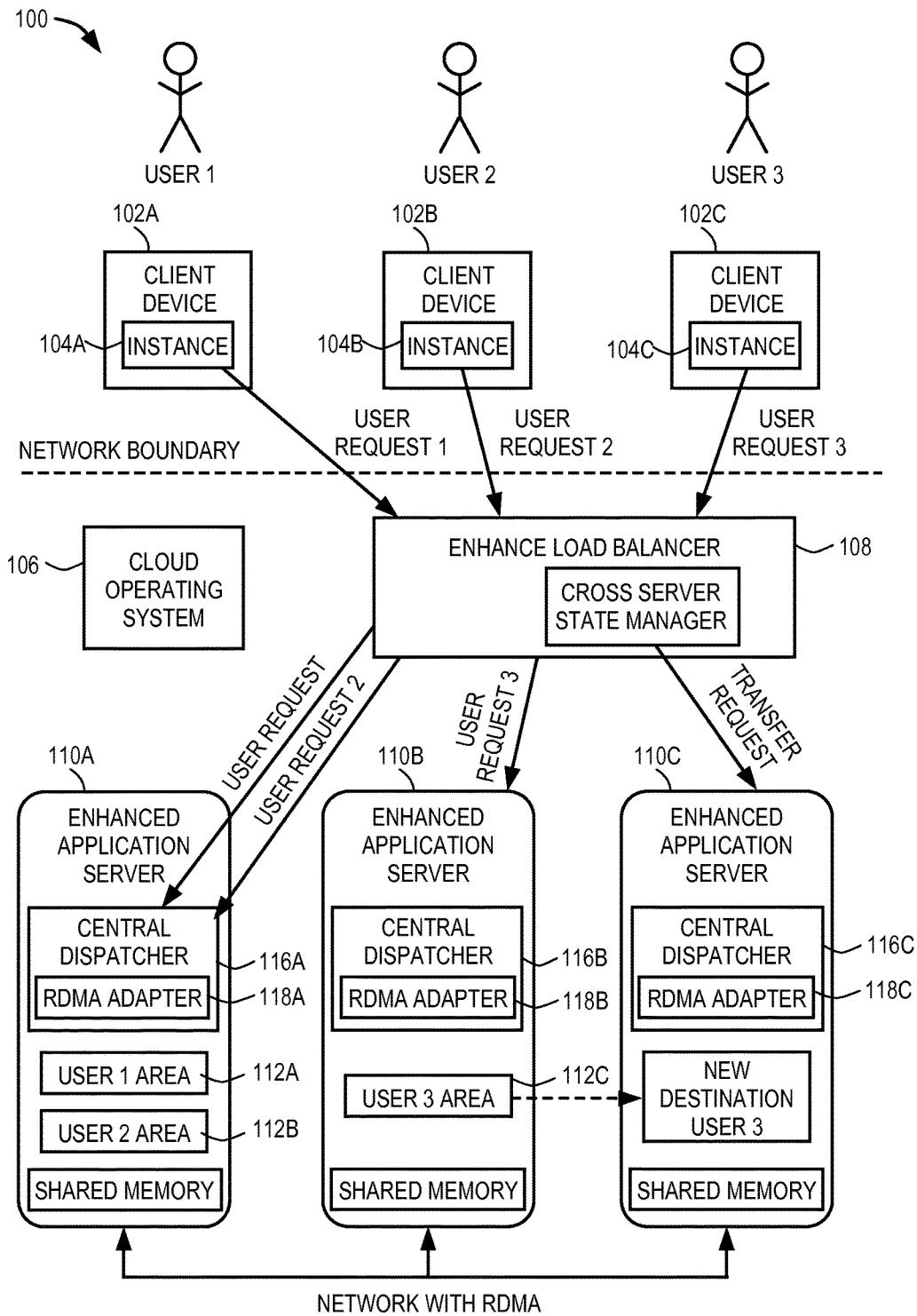
FIG. 1 is a block diagram illustrating a system, in accordance with an example embodiment, for enabling a cloud environment to support stateful applications.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a solution is provided that enables existing business applications to run in a cloud environment while at the same time being compliant with the stateless architecture principle (or at least fulfilling the objectives behind it without needing to be re-implemented).

In an example embodiment, the solution is provided generically at the application server level so that applications that don't follow a stateless computing protocol (e.g., REST) design do not have to be modified or reimplemented. The solution is based on enabling the cloud infrastructure to support a sticky user session, which can then be virtually transferred to another application server. A sticky user session is one in which a subsequent request from a client to a program is sent to the same instance of the program (i.e., sent to the same application server) as was a prior request. Virtual transfer of a session means that the session continues to live in the memory of the original application server (i.e., the application server where the session was originally created), but user requests related to it can be processed by another application server.

A virtual transfer of a user session can be executed on request and in a straightforward way without any latency. The virtual session transfer is not merely limited to user logon and communication data, but includes all relevant user data, including, for example, buffered data and a global program stack.

In order to accomplish this, in an example embodiment, a specific design of an application server is provided using isolated roll areas with work processes that can be flexibly attached and detached from a particular application server, making it possible to deal with the user-related memory and the program stack as a self-contained entity that can be processed at any time and by any application server runtime container. An example of such an application server is an Advanced Business Application Programming (ABAP) server, although one of ordinary skill in the art will recognize that this solution could be implemented on any runtime container on an application server that can allocate virtual memory using logical addresses.

In an example embodiment, in order to implement the above-described solution, the cloud environment is adapted. User logins are routed via a message server/load balancer. This means that all requests of a user are routed to the same application server unless a session is virtually transferred. Additionally, a new component known as the cross-server state manager component is deployed on the load balancer. The cross server state manager administrates the virtual transfer of the session. Therefore, it exposes an interface to the different application servers and also to the cloud operating system. The cross-server state manager maintains a catalog about virtually transferred sessions and dispatches the incoming user request accordingly. It knows which application server has to process the incoming user request, even if the session is on hold or created on a different application server. The cloud operating system can trigger a session transfer request for all users or for an individual user depending on the cloud service operation needed (e.g., application server maintenance, moving a particular user to a dedicated system, etc.).

FIG. 1 is a block diagram illustrating a system 100, in accordance with an example embodiment, for enabling a cloud environment to support stateful applications. The system 100 depicted here shows how a particular stateful application can be supported in the cloud, although one of ordinary skill in the art will recognize that the system can be extended to support any number of different stateful application. The system 100 includes one or more client device 102A-102C, each of which may run an instance 104A-104C of the stateful application.

In order to extend the application in the cloud, a cloud operating system 106 may operate an enhanced load balancer 108 to load balance requests from the various instances 104A-104C of the stateful application among multiple enhanced application servers 110A-110C. It should be noted that, even though the requests themselves are generated by the various instances 104A-104C of the stateful applications running on the client devices 102A-102C, these requests are still known as user requests as they often occur in response to some sort of user interaction with an instance 104A-104C of the stateful application. In some example embodiments, the various instances 104A-104C may be integrated into other applications, such as browsers, or embedded in an operating system.

Each client device 102A-102C can be assigned to a particular enhanced application server 110A-110C, but as described earlier the enhanced features of the enhanced application server 110A-110C allow the client device 102A-102C to be reassigned to a different enhanced application server 110A-110C on-the-fly, allowing for improved load balancing.

In the example in FIG. 1, both a first client device 102A and a second client device 102B are assigned to the first enhanced application server 110A, an both are assigned a roll area 112A, 112B respectively. Roll areas 112 will be described in more detail later. A third client device 102C is initially assigned to the second enhanced application server 110B and assigned roll area 112C but later, in order to improve load balancing, a cross-server state manager 114 decides to transfer the third client device 102C to the third enhanced application server 110C. This causes all subsequent requests from the third client device 102C to be directed to the third enhanced application server 110C. A new destination (virtual roll area) 112D of roll area 112C is made for the third enhanced application server 110C.

In an example embodiment, the virtual session transfer between the application servers 110B, 110C can be realized by enhancing the central request dispatcher 116A-116C of each enhanced application server 110A-110C, thus managing the application server memory by also leveraging a Remote Direct Memory Access Network (RDMA-Network) via an RDMA-Adapter 118A-118C. The RDMA-Network enables remote memory access which bypasses the kernel and implements zero-copy. This means that it does not need to copy data between application memory and the data buffer in the operating system. A virtual session transfer request for a specific user can be triggered by the cloud operating system 106 in case the host server is overloaded. As soon as a last incoming user request is processed and the work process is released, a virtual session transfer to the new enhanced application server 110 can be initiated. After that, all new incoming user requests for this user will be routed to the new application server 110 and processed by it. Thus, this solution provides an alternative way to achieve better system operation and better data center usages of the stateless computing protocol architecture principal without any need to re-implement existing business operations.

In an example embodiment, a specific memory management process may be utilized. When a process allocates virtual memory, a segment in physical memory is reserved and then linked to the same size of virtual address space. Some application servers, such as ABAP servers, deal with two categories of data: cross user data and user specific data. Cross user data include application buffer data, program execution area (program load plus constants), table buffer (e.g., IMG tables), and the like. User specific data is also known as user context and comprises user credentials, user authorizations and program stack data, such as ABAP variables, internal tables, and the like. Both data categories are contained in shared memory of the application server and can be made accessible (attached) to a work process. In an example embodiment, cross user data is always attached to the work process whereas user specific data is attached to the work process only in response to a user request.

Attaching a user context to a work process is called a roll-in process and detaching the user context from the work process is called a roll-out process. A rolled-out user context is an inactive user context. In order to process an incoming request, the appropriate inactive user context is rolled-in and attached to a free work process. Once the request is processed the user context is rolled-out and the work process is released. By allowing a user context to be rolled-in and rolled-out, a main program waiting on an incoming user request can be handed over at any time to another runtime engine running on a different application server that can continue to process it without any interruption.

Figure 2:
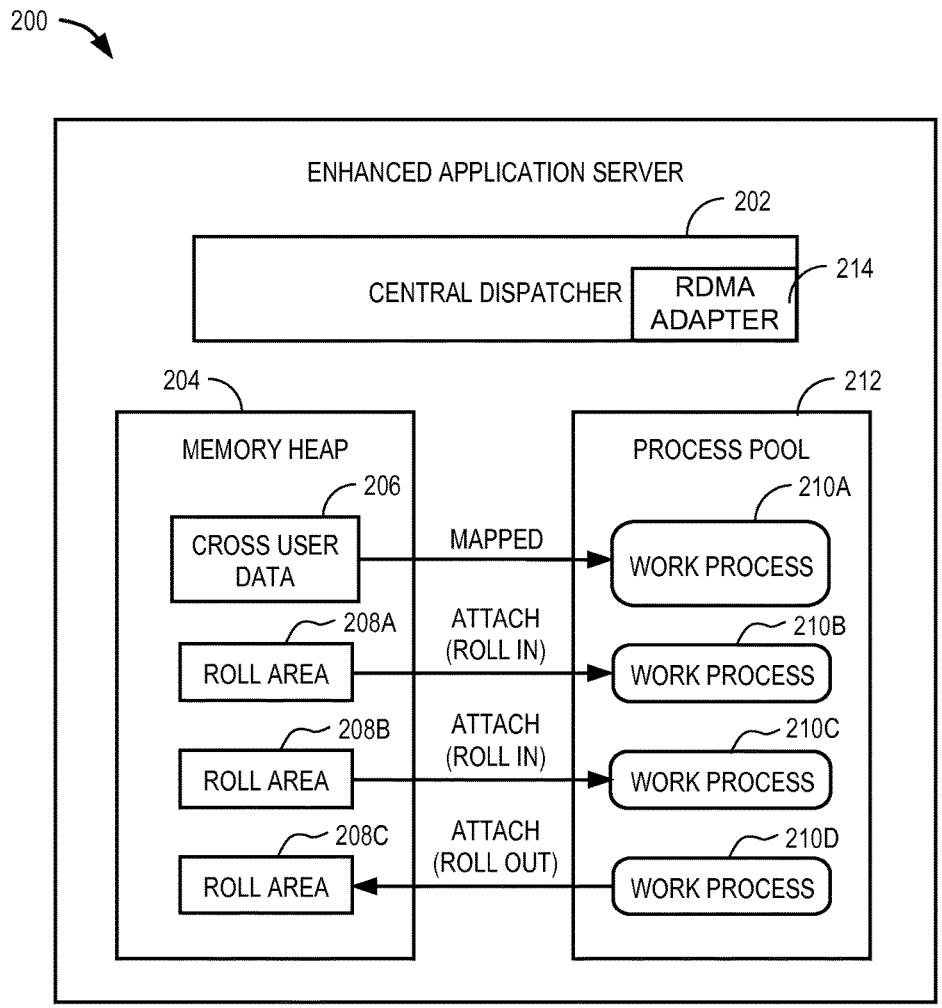
FIG. 2 is a block diagram illustrating an enhanced application server in accordance with an example embodiment.

FIG. 2 is a block diagram illustrating an enhanced application server 200 in accordance with an example embodiment. Specifically depicted here is the roll area management process. The enhanced application server 200 includes a central request dispatcher 202 that receives user requests and also receives requests from a state manager to perform a session transfer. A memory heap 204 may represent shared memory and may store cross user data 206 as well as a roll area 208A-208C assigned to each user assigned to the enhanced application server 200. As described earlier, the cross user data 206 can be attached to a work process 210A in the process pool 212. Individual roll areas 208A-208B can also be assigned work processes 210B-210C in response to a user request. A user context can also be rolled out of a work process 210, which is depicted here as detaching the user context contained in roll area 208C from work process 210D An RDMA network enables transferring data directly to or from application memory without involving the operating system kernel. In an example embodiment, application servers 200 are connected to each other using an RDMA enabled network. The network interface card (MC) can provide a process with a private network. The private network is exposed to the process as a virtual interface (VI). A communication and data transfer takes places over a pair of such VIs (one on the sending side and one on the receiving side). In an example embodiment, a central request dispatcher 202, which is the main work coordinator component of the application server 200, on both application servers 200 (the source application server and the target application server) will manage the remote memory access between the application servers 200, leveraging the RDMA network.

When server overload occurs, a user session may have to be virtually transferred from one application server 200 to another. This transfer may occur incrementally. In a first step, the cross user data 206 is populated to the work processes 210 of the target application server 200. The dispatchers ensure that cross user data 206 available in the shared memory of the source application server is always available on the target application server. This can be performed by comparing the shared memories to nonuser specific data. The missing data in the shared memory of the target application server is loaded to the shared memory by accessing the database. It is then attached to the work processes 210. After that, the dispatcher 202 can create, for each inactive user context on the source/current overloaded application server, a corresponding virtual user context on the target application server via establishing a pair of VIs.

When the newly created context on the target server is rolled in, the shared memory of the source server is accessed remotely and data located in the corresponding memory address is accessed. This means that while the user request is processed via a work process 210 belonging to the target host, the session data is still located on the source host.

The above-mentioned dispatcher functionality belongs, in an example embodiment, to a new logical RDMA adapter component 214, which will interface with the memory management and the cross application server state manager component.

Figure 3:
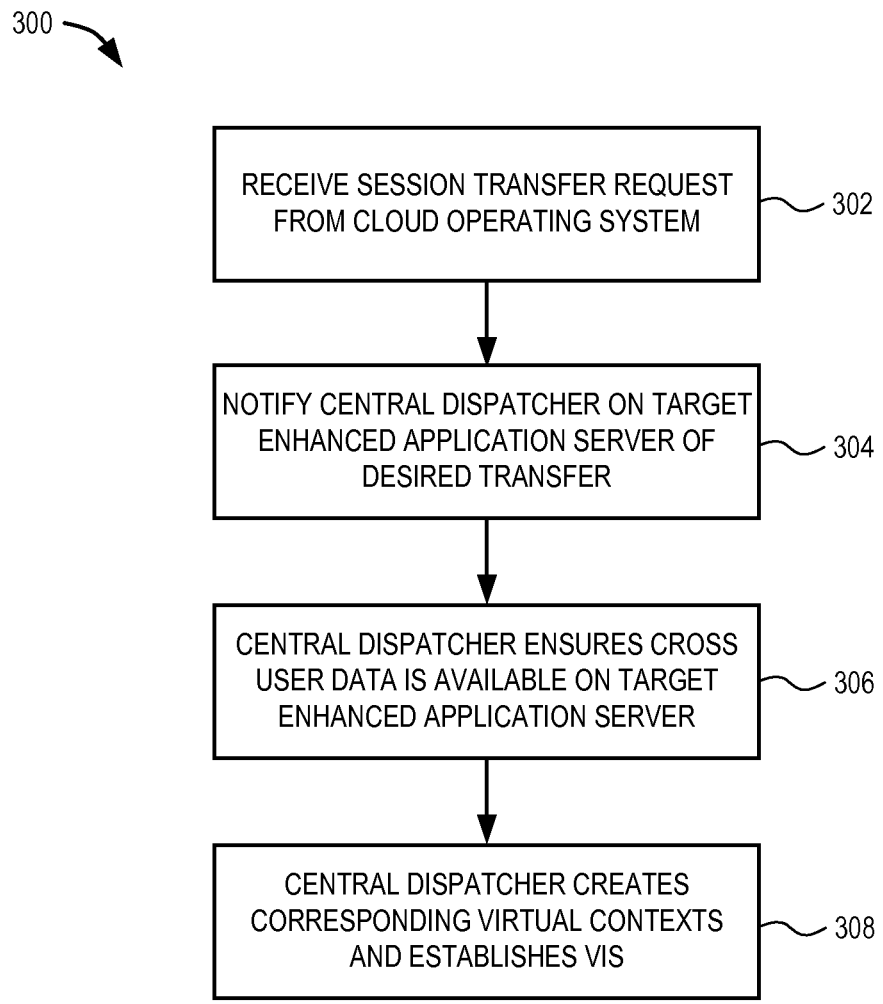
FIG. 3 is a flow diagram illustrating a method, in accordance with an example embodiment, for causing a session transfer from one enhanced application server to another enhanced application server.

FIG. 3 is a flow diagram illustrating a method 300, in accordance with an example embodiment, for causing a session transfer from one enhanced application server 200 to another enhanced application server 200. At operation 302, a session transfer request is received from a cloud operating system 106. This session transfer request may be received by an enhanced load balancer 108, and, in some example embodiments, a state manager within the enhanced load balancer 108. In an example embodiment, the state manager may be a cross server state manager 114 as described above.

This session transfer request may have been generated in response to a determination that a client session should be transferred from one enhanced application server 200 to another. This determination can be made, for example, if the cloud operating system 106 determines that a currently used enhanced application server 200 is overloaded or otherwise unavailable from the technical side (e.g., communication has dropped). Alternatively, this determination could be made to migrate a particular user or client to a dedicated enhanced application server 200. No matter the reason, once the session transfer request is received at operation 302, then, at operation 304, the state manager notifies a central dispatcher 202 on the target enhanced application server 200 of the desired transfer. As will be seen, this notification will allow the central dispatcher 202 on the target enhanced application server 200 to initiate the desired set up. As such, the notification may include not just a notification that a session transfer is desired but also an identification of the particular client and/or user corresponding to the session, as well as the source enhanced application server (i.e., the enhanced application server 200 currently assigned to the client and/or user).

At operation 306, the central dispatcher 202 at the target enhanced application server 200 ensures that cross user data 206 from the source enhanced application server 200 is also available on the target enhanced application server 200. As described earlier, this can be performed using shared memory rather than by a direct copy from the source enhanced application server 200 to the target enhanced application server 200. Specifically, the data in a roll area 208 of an enhanced application server 200 may always be copied into a shared memory, which is then distributed as needed via the network via RDMA to shared memory on the target enhanced application server 200. As such, the central dispatcher 202 at the target enhanced application server 200 achieves this copying by attaching to a work process 210 associated with the session in a database.

At operation 308, the central dispatcher 202 of the target enhanced application server 200 creates corresponding virtual contexts and establishes VIs on the target enhanced application server 200. At that point, requests received from the client and/or user can be handled by the target enhanced application server 200 instead of the source enhanced application server 200.

Figure 4:
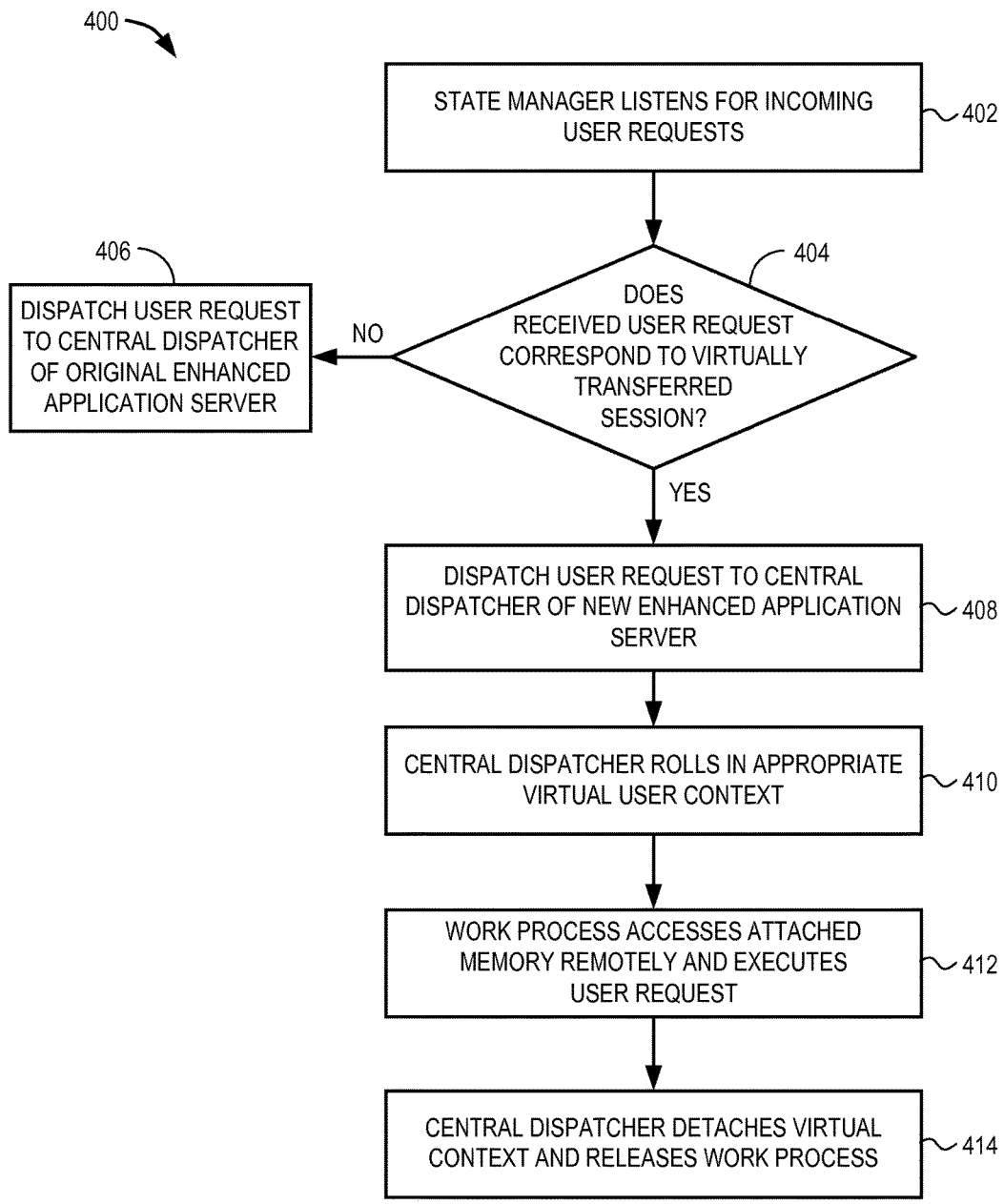
FIG. 4 is a flow diagram illustrating a method, in accordance with an example embodiment, for handling incoming user requests.

FIG. 4 is a flow diagram illustrating a method 400, in accordance with an example embodiment, for handling incoming user requests. At operation 402, a state manager may listen for incoming user requests. This operation may be performed in a load balancing component of a cloud environment. At operation 404, it may be determined if a received user request relates to a virtually transferred session. This may be accomplished in a number of different ways. In one example, a table of virtually transferred sessions (stored with session identifiers) may be maintained by the load balancing component, and this operation may be performed by referencing that table and determining if a match occurs between a session identifier corresponding to the incoming request and one of the session identifiers in the table.

If the user request is not related to a virtually transferred session, then, at operation 406, the user request is dispatched to the central dispatcher 202 of the original enhanced application server 200 (the application server that the previous user request from the user/client was serviced by). If, however, the user request is related to a virtually transferred session, then, at operation 408, the user request is dispatched to the central dispatcher 202 of the new enhanced application server 200. The aforementioned table may, in some example embodiments, store an identification of the new enhanced application server 200 for each virtually transferred session, and thus this table may be referenced in this operation to locate the new enhanced application server 200.

At operation 410, the central dispatcher 202 of the new enhanced application server 200 rolls in the appropriate virtual user context. At operation 412, a work process 210 in the new enhanced application server 200 accesses attached memory remotely and executes the user request. At operation 414, the central dispatcher 202 at the new enhanced application server 200 detaches the virtual context and releases the work process 210.

Figure 5:
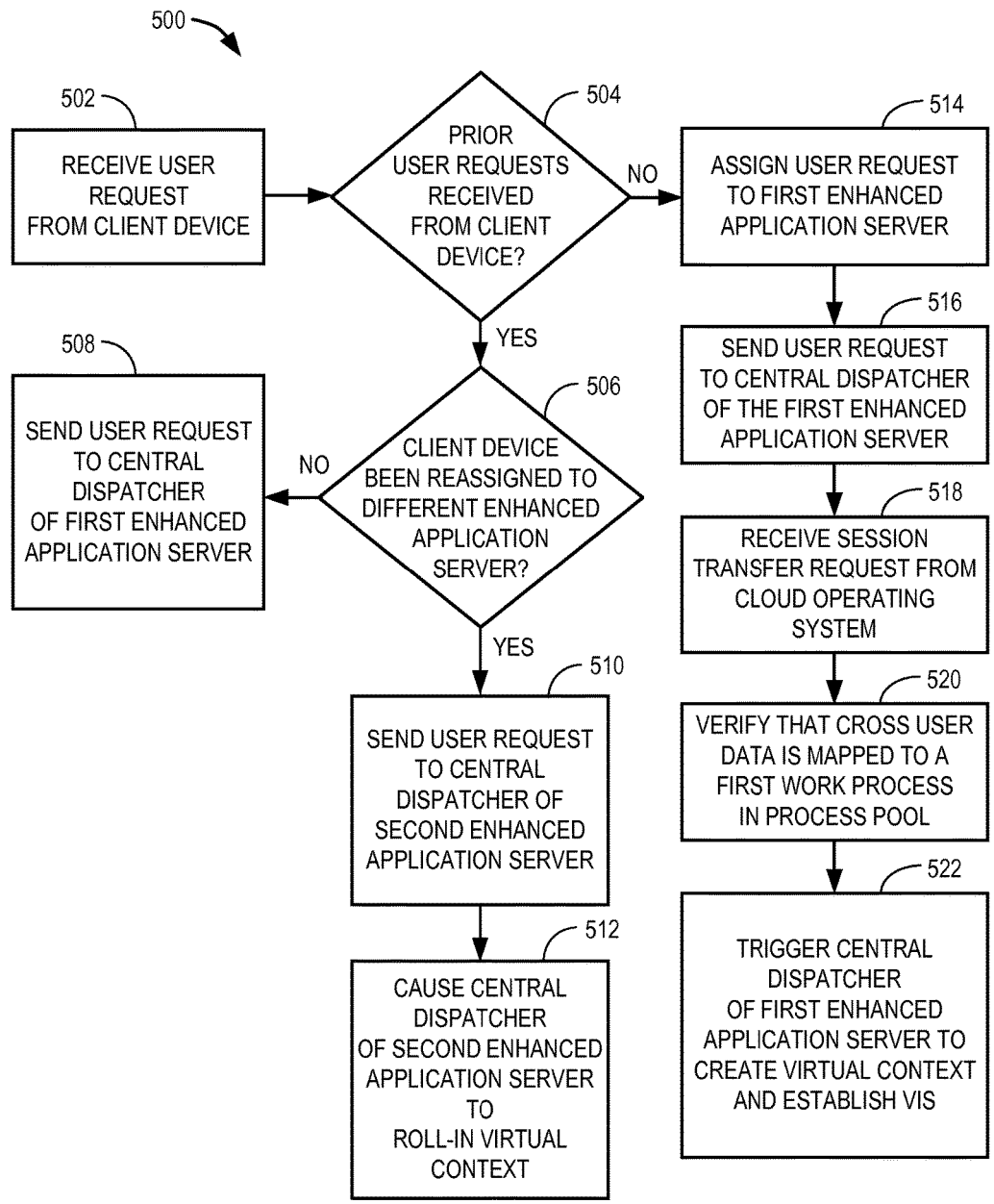
FIG. 5 is a flow diagram illustrating a method, in accordance with an example embodiment, of operating an enhanced load balancer in a cloud computing environment.

FIG. 5 is a flow diagram illustrating a method 500, in accordance with an example embodiment, of operating an enhanced load balancer 200 in a cloud computing environment. At operation 502, a user request from a client device 102 is received. The first user request is a request to perform an action in an application hosted by a plurality of enhanced application servers 200 in the cloud computing environment. At operation 504, it is determined whether any prior user requests have been received from the client device 102. If so, then at operation 506 it is determined whether the client device 102 has been reassigned to a different enhanced application server 200. If not, then at operation 508 the user request is sent to a central dispatcher 202 of a first enhanced application server 200 (corresponding to an enhanced application server 200 previously assigned to the first user device). If so, then at operation 510, the user request is sent to a central dispatcher 202 of a second enhanced application server 200 (corresponding to an enhanced application server 200 that the user device has previously been reassigned to). Then, at operation 512, the central dispatcher 202 of the second enhanced application server 200 is caused to roll-in already setup virtual context [roll area 208], thus allowing the second enhanced application server 200 to remotely access memory on the first enhanced application server 200 and execute the user request. This may cause the central dispatcher 202 of the second enhanced application server 200 to attach the first roll area 208A, which corresponds to the virtual context to the first work process 210A.

If, at operation 504, it is determined that no prior user requests have been received from the client device 102, then at operation 514 a first enhanced application server 200 is assigned to the first client device 102 and at operation 516 the first user request is sent to the central dispatcher 202 of the first enhanced application server 200, thus establishing a first active session between the first client device 102 and the first enhanced application server 200.

At operation 518, a session transfer request is received from a cloud operating system 106. The session transfer request may identify the first active session and a second enhanced application server 200 to which to transfer the first active session. The session transfer request may be generated by the cloud operating system 106 in response to a determination that the first enhanced application server 200 is overloaded, or for some other reason why the client device 102 should be reassigned to a different enhanced application server 200 (such as a desire to assign the client device 102 to a dedicated enhanced application server 200). At operation 520, it is verified that cross user data 206 is mapped to a first work process 210 in a process pool 212 of the cloud computing environment. The cross user data 206 contains information used by a plurality of sessions, including the first active session.

At operation 522, a central dispatcher 202 on the first enhanced application server 200 is triggered to create, on the first enhanced application server 200, a virtual context and establishes VIs corresponding to the client device 102.

Figure 6:
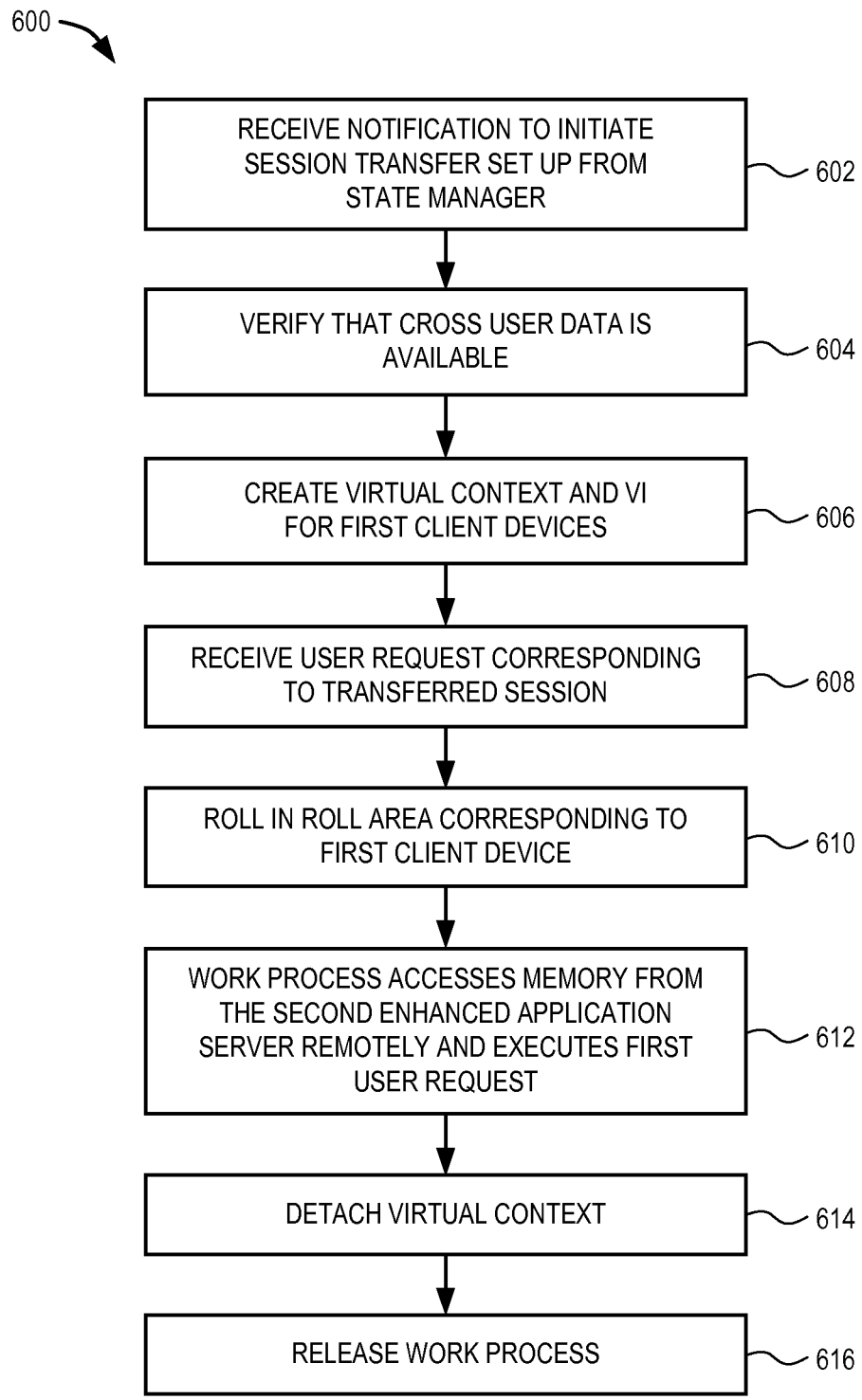
FIG. 6 is a flow diagram illustrating a method, in accordance with an example embodiment, of operating a first enhanced application server in a cloud computing environment.

FIG. 6 is a flow diagram illustrating a method 600, in accordance with an example embodiment, of operating a first enhanced application server 200 in a cloud computing environment. At operation 602, a notification to initiate session transfer set up is received from a state manager. This notification may include an identification of a first client device 102 that was part of the session to be transferred. At operation 604, it is verified that cross user data 206 is available. At operation 606, a virtual context and VI is created for the first client device 102. At operation 608, a user request corresponding to the transferred session is received. At operation 610, a roll area 208 corresponding to the first client device 102 is rolled in. This may include attaching the roll area 208 on a second enhanced application server 200 to a work process 210. At operation 612, the work process 210 accesses memory of the second enhanced application server 200 remotely and executes the user request. At operation 614, the virtual context is detached. At operation 616, the work process 210 is released.

Example Mobile Device

Figure 7:
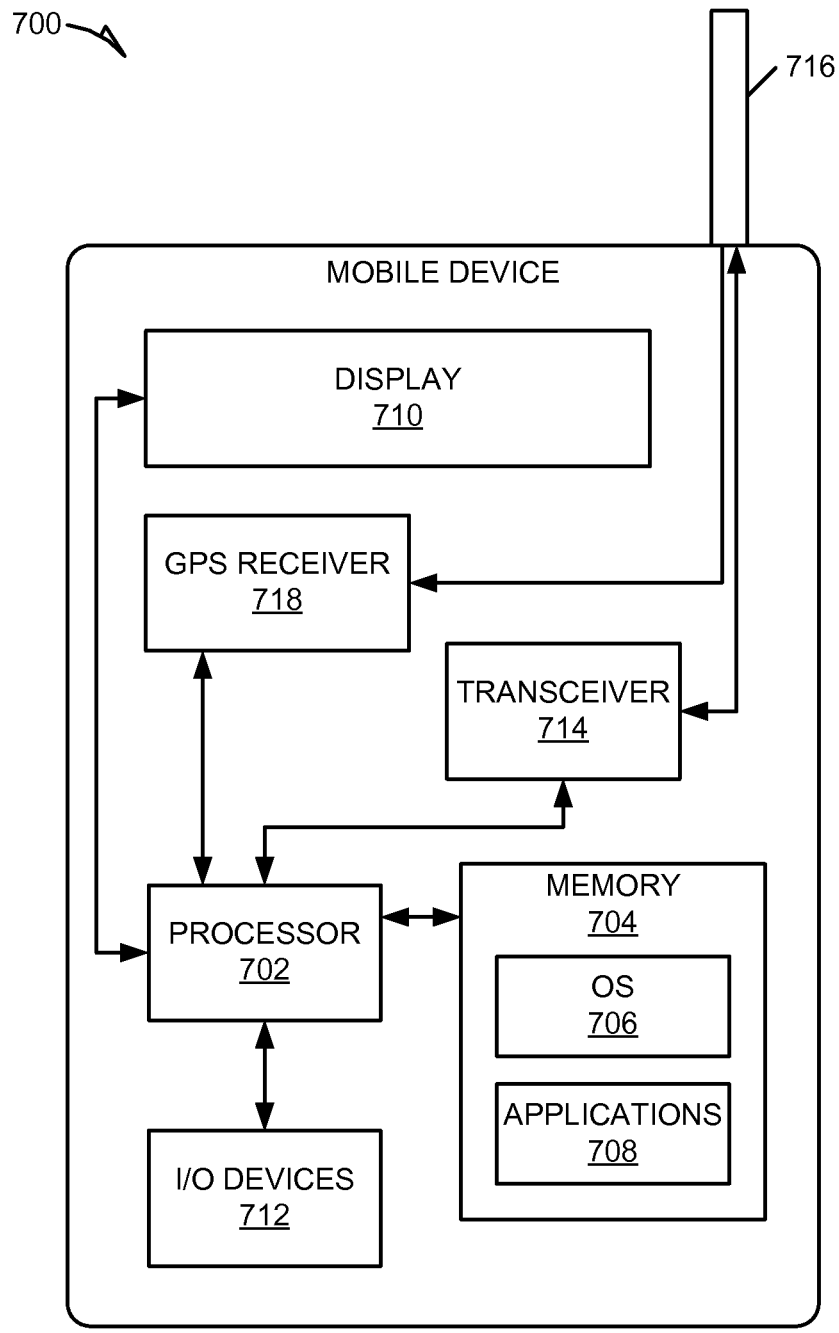
FIG. 7 is a block diagram illustrating a mobile device, according to an example embodiment.

FIG. 7 is a block diagram illustrating a mobile device 700, according to an example embodiment. The mobile device 700 may include a processor 702. The processor 702 may be any of a variety of different types of commercially available processors 702 suitable for mobile devices 700 (for example, an XScale architecture microprocessor, a microprocessor without interlocked pipeline stages (MIPS) architecture processor, or another type of processor 702). A memory 704, such as a random access memory (RAM), a flash memory, or another type of memory, is typically accessible to the processor 702. The memory 704 may be adapted to store an operating system (OS) 706, as well as application programs 708, such as a mobile location enabled application that may provide location-based services to a user. The processor 702 may be coupled, either directly or via appropriate intermediary hardware, to a display 710 and to one or more input/output (I/O) devices 712, such as a keypad, a touch panel sensor, a microphone, and the like. Similarly, in some embodiments, the processor 702 may be coupled to a transceiver 714 that interfaces with an antenna 716. The transceiver 714 may be configured to both transmit and receive cellular network signals, wireless data signals, or other types of signals via the antenna 716, depending on the nature of the mobile device 700. Further, in some configurations, a GPS receiver 718 may also make use of the antenna 716 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors (e.g., processor 702) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 702 or another programmable processor 702) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 702 configured using software, the general-purpose processor 702 may be configured as respective different hardware-implemented modules at different times. Software may accordingly configure a processor 702, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications among such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processor or processors 702 may be located in a single location (e.g., within a home environment, an office environment, or a server farm), while in other embodiments, the processors 702 may be distributed across a number of locations.

The one or more processors 702 may also operate to support performance of the relevant operations in a "cloud computing" environment or as a "software as a service" (SaaS). For example, at least some of the operations may be performed by a group of computers (as examples of machines including processors 702), these operations being accessible via a network (e.g., the Internet) and via one or more appropriate interfaces (e.g., application programming interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 702, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 702 executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 702), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
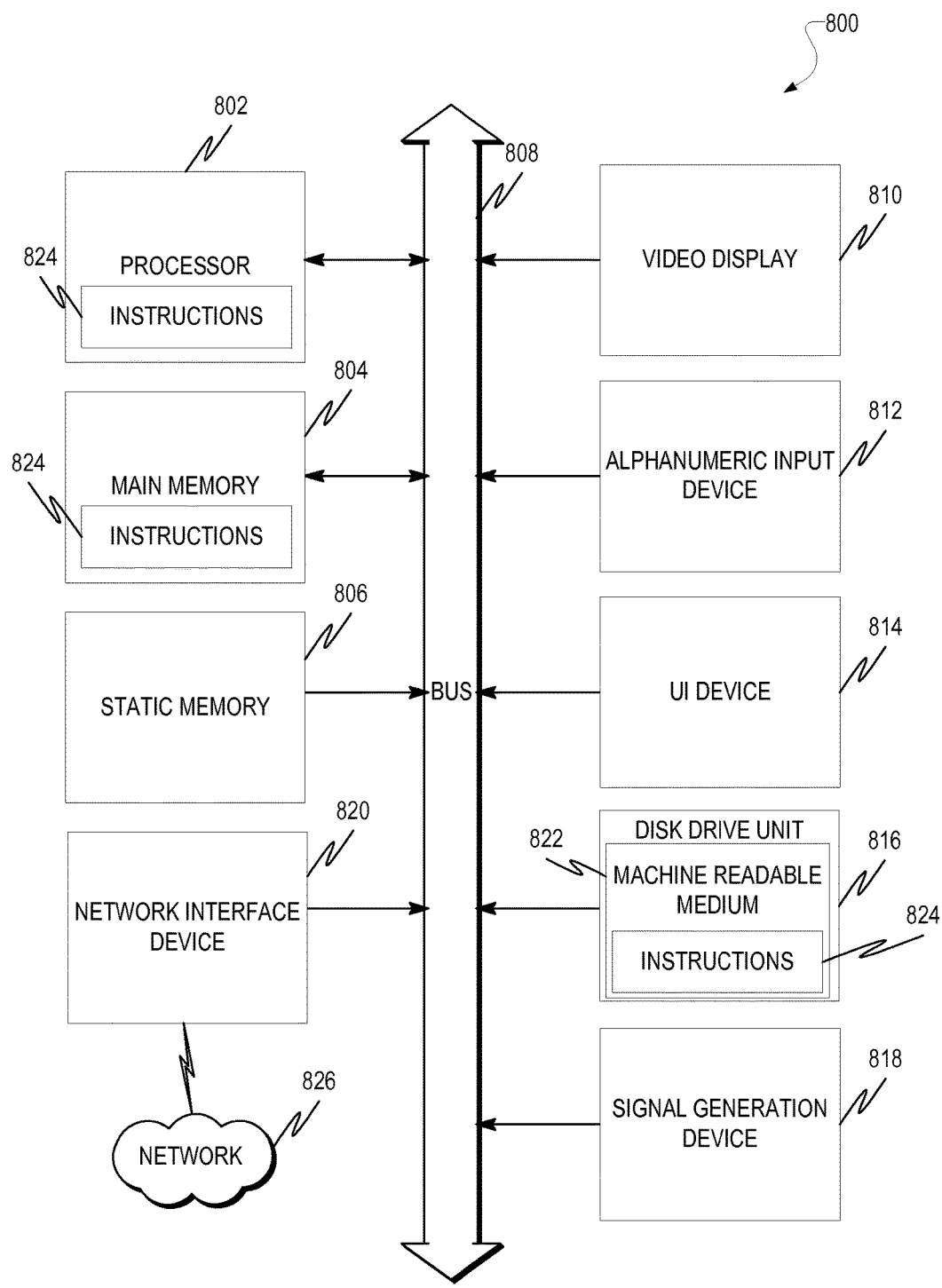
FIG. 8 is a block diagram of machine in the example form of a computer system within which instructions may be executed for causing the machine to perform any one or more of the methodologies discussed herein.

FIG. 8 is a block diagram of machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions 824 (sequential or otherwise) that specify actions to be taken by that machine. Further, while only a single machine is illustrated, the term "machine" shall also be taken to include any collection of machines that individually or jointly execute a set (or multiple sets) of instructions 824 to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown, in an example embodiment, to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks 826 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

receiving, at an enhanced load balancing component in a cloud computing environment, a first user request from a first client device to perform an action in an application hosted by at least a first enhanced application server and a second enhanced application server in the cloud computing environment;

sending the first user request to a central dispatcher on the first enhanced application server for execution, to establish a first active session between the first client device and the first enhanced application server;

receiving a session transfer request from a cloud operating system in the cloud computing environment, the session transfer request identifying the first active session and a second enhanced application server to which to transfer the first active session;

verifying that cross user data containing information used by a plurality of sessions, including the first active session, is mapped to work processes in a process pool of the second enhanced application server, wherein the cross user data comprises a table buffer;

triggering a central dispatcher on the second enhanced application server to create, on the second enhanced application server, a virtual context corresponding to the first client device and establish corresponding virtual interfaces (VIs) to the first enhanced application server;

receiving a second user request from the first client device to perform an action in the application;

sending the second user request to the central dispatcher of the second enhanced application server; and causing the central dispatcher of the second enhanced application server to roll-in the virtual context by attaching a first roll area to a first work process, wherein the first roll area comprises one of user credentials, user authorizations, or application instance stack data, the virtual context corresponding to the first client device and stored on the first enhanced application server, to the second enhanced application server, wherein the virtual context, when executed by the second enhanced application server, causes the second enhanced application server to remotely access session data stored in memory on the first enhanced application server and execute the second user request.

2. The method of claim 1, wherein the session transfer request is generated by the cloud operating system in response to a determination that the first enhanced application server is overloaded.

3. The method of claim 1, wherein the session transfer request is generated by the cloud operating system in response to a decision to assign the first client device to a dedicated enhanced application server.

4. The method of claim 1, wherein the causing the central dispatcher of the second enhanced application server to roll-in a first roll area causes the central dispatcher of the second enhanced application server to attach the first roll area to the first work process.

5. The method of claim 1, wherein the remotely accessing memory on the first enhanced application server is accomplished using a remote direct memory access network.

6. The method of claim 5, wherein the first process is provided with a private network by a network interface card (NIC), the private network exposed to the first process as the virtual interface.

7. The method of claim 1, wherein the cross user data and the first roll in area are stored in shared memory.

8. A cloud computing system comprising:
a cloud operating system executable on one or more processors;
a process pool containing processes to execute;
an enhanced load balancing component; and
a plurality of enhanced application servers, each hosting a first application and containing a central dispatcher and shared memory;
the enhanced load balancing component configured to:
receive, at an enhanced load balancing component in a cloud computing environment, a first user request from a first client device to perform an action in an application hosted by at least a first enhanced application server and a second enhanced application server in the cloud computing environment;
send the first user request to a central dispatcher on the first enhanced application server for execution, to establish a first active session between the first client device and the first enhanced application server;
receive a session transfer request from a cloud operating system in the cloud computing environment, the session transfer request identifying the first active session and a second enhanced application server to which to transfer the first active session;
verify that cross user data containing information used by a plurality of sessions, including the first active session, is mapped to work processes in a process pool of the second enhanced application server, wherein the cross user data comprises a table buffer;
trigger a central dispatcher on the second enhanced application server to create, on the second enhanced application server, a virtual context corresponding to the first client device and establish corresponding virtual interfaces (VIs) to the first enhanced application server;

receive a second user request from the first client device to perform an action in the application;
send the second user request to the central dispatcher of the second enhanced application server; and
cause the central dispatcher of the second enhanced application server to roll-in the virtual context by attaching a first roll area to a first work process, wherein the first roll area comprises one of user credentials, user authorizations, or application instance stack data the virtual context corresponding to the first client device and stored on the first enhanced application server, to the second enhanced application server, wherein the virtual context, when executed by the second enhanced application server, causes the second enhanced application server to remotely access session data stored in memory on the first enhanced application server and execute the second user request.

9. The cloud computing system of claim 8, the enhanced load balancing component comprising a cross server state manager.

10. The cloud computing system of claim 8, each of the central dispatchers including an RDMA adapter.

11. The cloud computing system of claim 8, wherein the shared memories on each of the plurality of enhanced application servers is connected to one another via a network with RDMA.

12. A non-transitory machine-readable storage medium comprising instructions which, when implemented by one or more machines, cause the one or more machines to perform operations comprising:
receiving, at an enhanced load balancing component in a cloud computing environment, a first user request from a first client device to perform an action in an application hosted by at least a first enhanced application server and a second enhanced application server in the cloud computing environment;
sending the first user request to a central dispatcher on the first enhanced application server for execution, to establish a first active session between the first client device and the first enhanced application server;
receiving a session transfer request from a cloud operating system in the cloud computing environment, the session transfer request identifying the first active session and a second enhanced application server to which to transfer the first active session;
verifying that cross user data containing information used by a plurality of sessions, including the first active session, is mapped to work processes in a process pool of the second enhanced application server, wherein the cross user data comprises a table buffer;
triggering a central dispatcher on the second enhanced application server to create, on the second enhanced application server, a virtual context corresponding to the first client device and establish corresponding virtual interfaces (VIs) to the first enhanced application server;
receiving a second user request from the first client device to perform an action in the application;
sending the second user request to the central dispatcher of the second enhanced application server; and
causing the central dispatcher of the second enhanced application server to roll-in the virtual context by attaching a first roll area to a first work process, wherein the first roll area comprises one of user credentials, user authorizations, or application instance stack data, the virtual context corresponding to the first client device and stored on the first enhanced application server, to the second enhanced application server, wherein the virtual context, when executed by the second enhanced application server, causes the second enhanced application server to remotely access session data stored in memory on the first enhanced application server and execute the second user request.

13. The non-transitory machine-readable storage medium of claim 12, wherein the session transfer request is generated by the cloud operating system in response to a determination that the first enhanced application server is overloaded.

14. The non-transitory machine-readable storage medium of claim 12, wherein the session transfer request is generated by the cloud operating system in response to a decision to assign the first client device to a dedicated enhanced application server.

15. The non-transitory machine-readable storage medium of claim 12, wherein the causing the central dispatcher of the second enhanced application server to roll-in a first roll area causes the central dispatcher of the second enhanced application server to attach the first roll the first work process.

* * * * *